United States Patent Office 3,353,557
Patented Nov. 21, 1967

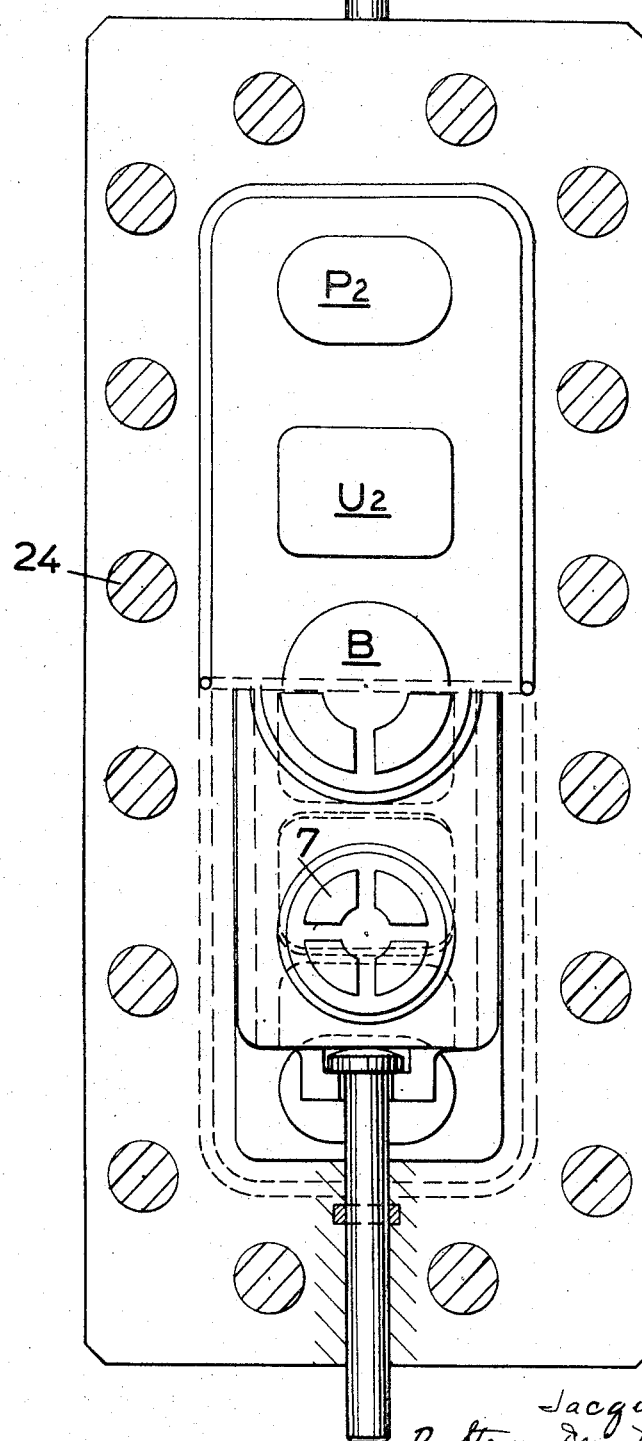

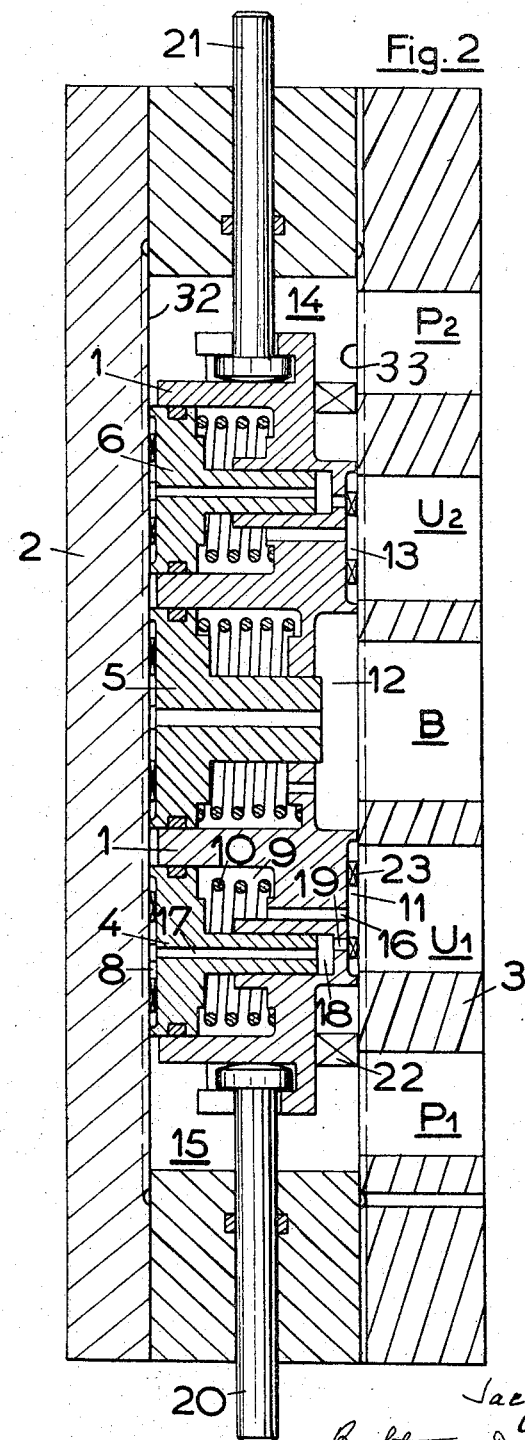

3,353,557
DISTRIBUTOR VALVE
Jacques Faisandier, 32 Blvd. Felix Faure, Chatillon-sous-Bagneux, Seine, France
Filed June 12, 1964, Ser. No. 374,589
Claims priority, application France, June 20, 1963, 938,759
4 Claims. (Cl. 137—625.48)

The invention relates to balanced slide-valves and more particularly to flat reverse cycle slide-valves.

Flat valves, also called shell valves, are used in steam engines with low power and medium speed. The valve member is pressed strongly on the port-forming plate by the admitted steam. In consequence, the steam seal is satisfactory, but the effort required to overcome the friction is considerable.

In the present art, these valves are unsuitable wherever the displacements of the valve member must be effected by means of comparatively small forces and at comparatively high speeds, such as, for example, the forces exerted by manual controls or by an electro-magnet or by an electro-valve controlled by an electro-magnet, as required for certain applications, for example, for hydraulic servo-controls.

The object of the present invention is a valve member structure providing a total balance relative to the pressure of the operating fluid, the contact pressure on the port-forming plate and the pressure plate being obtained by the sole action of springs, whereby said pressure may be adjusted to a value sufficient to ensure fluid seal and which is independent of the pressure of the operating fluid.

According to the present invention, the balance is obtained by a valve member structure comprising three balancing pistons pressing on one side on a pressure surface, parallel to the port-forming plate and, on the other side, pressing the valve member resiliently against the port-forming plate, by means of calibrated springs.

According to the present invention, in the neutral position of the valve member, the center piston is pressed on a portion of said pressure surface opposite the central port, which is generally and preferably the port connected to the tank. Also, the two other pistons, arranged symmetrically to the first, exert their action on the portions of said pressure surface opposite the ports, arranged symmetrically relative to the center port.

According to the invention, the three balancing pistons are themselves balanced.

The invention will be further described, by way of example, and in a nonlimitative manner, with reference to an embodiment shown in the accompanying drawings, in which:

FIG. 1 is a plan view of a valve distributor including a valve member according to the invention. The plate of the chest has been partly removed and in the upper part, the valve member has also been removed;

FIG. 2 is a cross-section along a plane passing through the axis of the central rods of the valve and perpendicular to the port-forming plate.

In the drawings, 1 indicates the valve member which is shown in the neutral or inoperative position and consists of a thin machined elongated block-like plate which slides between two parallel plates 2 and 3 constituting two of the walls of the wall chest.

The internal surfaces of plates 2 and 3 with which the valve member 1 is in sliding arrangement are designated by 32 and 33 respectively. $P_1$ and $P_2$ are the end ports connected to the pressurized source, $U_1$ and $U_2$ are the intermediate ports through which the flow is to be reversed, and B is the central port connected with the tank.

The five corresponding orifices are machined into the port forming plate 3.

The valve 1 is shown in the inoperative position in which the central port B and the ports $U_1$ and $U_2$ are closed by the valve member, the end ports $P_1$ and $P_2$ being in constant communication, respectively, with the chambers 15 and 14, defined between the end walls of the chest by the valve member.

Into the plate forming the valve member are machined three cylinders for three balancing pistons 4, 5, 6 respectively. The external surface of each piston rests against the slide face 32 only through its periphery, so that this external surface forms a recess 8, and, additionally through auxiliary supporting members, forms circumferential shaped sectors, such as 7. The opposite face of each piston defines, in the corresponding cylinder, a chamber 9 which contains a calibrated spring 10 resting on one side against said opposite face and on the other side against the bottom of the corresponding cylinder. The spring therefore urges the valve member against the surface 33 and the external surface of the piston 4 against the surface 32.

Each piston has a rod guided in a socket formed in the bottom of the corresponding cylinder, each rod defining, in the corresponding socket, a chamber 18.

Facing the ports $U_1$, B and $U_2$, in the represented inoperative position of the valve, three recesses 11, 12 and 13 respectively, are formed in the valve member. The dimensions and shape of these chambers are such that they respectively cover the corresponding port. The lengths of the recesses in the sliding direction of the valve member are such that, in the one end position, the valve connects port $U_1$ with port B and port $U_2$ with port $P_2$. For reasons of symmetry, the movement of the valve to its other end position connects port $U_2$ with port B and port $U_1$ with port $P_2$. The stroke of the valve may be, for example, of the order of 10 mm.

Considering particularly the cylinder containing piston 4, the chamber 9 communicates with the recess 11 by means of a conduit 16, and the rod of piston 4 is provided with a channel 17 whereby the recesses 8 and 11 may communicate through said chamber 18 and channel 19.

The preceding description relating to the balancing piston 4 applies equally to each of the other balancing pistons.

Reference numerals 20 and 21 indicate the control and/or guide rods of the valve member.

Members such as 22 and 23 are supporting members. They have been marked in a conventional manner by a cross to indicate that they do not interrupt the hydraulic continuity.

Reference numeral 24 indicates one of the bolts for assembling the plates 2 and 3 and the end walls of the chest.

Considering once more the piston 4, it may be seen that its two faces support the same effect, the pressure in the recesses 8, 11 and the chambers 9, 18 being the same, which pressure is either the operating pressure or, alternatively, the pressure in the tank. The piston 4 is therefore balanced and the pressure surface 32 is only submitted to the pressure caused by the action of the spring 10.

In the same manner the forces acting on the surfaces of the valve member in the chambers 9, 18 on the one hand, and in the recess 11 on the other hand may be balanced, taking into consideration the forces acting on surfaces of the valve member in the end chambers 14 and 15, which are continuously submitted to the operating pressure.

The same description may be also applied to piston 6. Regarding piston 5, the conditions also will be the same with the exception that the chamber 18 might easily be omitted for structural reasons, and that this piston and the associated chambers and recesses are invariably subjected to the tank pressure.

Of course, variations of the specific construction and arrangement of this type mechanism herein disclosed can be made by those skilled in the art without departing from the invention as defined in the appended claims.

I claim:

1. A reverse cycle valve comprising a chest having an internal chamber of a flat parallelpiped shape and including a pressure plate and a port-forming plate, parallel one with the other, and a valve member of a flat parallelpiped shape and having two faces slidably engaging said plates, respectively; the port-forming plate having a central port, two end ports, one on each side of said central port, and two intermediate ports, each between the central port and one of the end ports; the face of said valve member in contact with the said port-forming plate having three recesses covering respectively said central port and said two intermediate ports in the neutral position of the slide valve; said valve member having three cylinders respectively opening adjacent said pressure plate on three portions of said pressure plate, said portions being opposite said central port and said intermediate ports in the neutral position of the valve member; a piston disposed in each of said cylinders and defining a first chamber in each corresponding cylinder; each piston having a face engaging said pressure plate and including a recess formed in said face, each piston having a rod guided in a socket formed at the bottom of the corresponding cylinder, each rod defining in the corresponding socket a second chamber; a spring in each of the said first chambers being disposed so as to urge the corresponding piston onto said pressure plate; each of the said pistons and the corresponding piston rods having internal conduits to put the corresponding piston recess into communication with the corresponding second chamber; and conduits in said valve member to put each first and second chamber in communication with the corresponding recess formed in the face of said valve member; the whole formed by the chest and the valve member being symmetrical in relation to a perpendicular plane as regards the direction of movement of the valve member when the valve member is in its neutral position.

2. A valve as claimed in claim 1, wherein for each piston, the surfaces of the piston recess, on one part; and the surfaces of the piston in said first chamber and of the rod in said second chamber, on the second part, are balanced.

3. A valve as claimed in claim 1, in which for each piston the surfaces of the piston recess and of the corresponding valve member recess are balanced.

4. A valve as claimed in claim 1, in which the second chamber of the middle socket and the corresponding recess formed in the valve member are constituted by the same cavity.

References Cited
UNITED STATES PATENTS

| | | | |
|---|---|---|---|
| 397,170 | 2/1889 | Cleaver | 251—176 |
| 742,501 | 10/1903 | Schenebeck | 251—176 |
| 1,066,427 | 7/1913 | Dockings | 251—176 |
| 1,140,188 | 5/1915 | Robinson | 251—176 |
| 2,560,841 | 7/1951 | Bishop | 251—176 X |
| 2,828,767 | 4/1958 | Barusch | 137—625.48 X |

M. CARY NELSON, *Primary Examiner.*

E. K. FEIN, R. C. MILLER, *Assistant Examiners.*